(12) United States Patent
Wood et al.

(10) Patent No.: US 7,617,022 B1
(45) Date of Patent: Nov. 10, 2009

(54) DUAL WAVELENGTH ENHANCED VISION SYSTEM OPTIMIZED FOR VISUAL LANDING LIGHT ALIGNMENT

(75) Inventors: Robert B. Wood, Beaverton, OR (US);
Carlo L. Tiana, Portland, OR (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 748 days.

(21) Appl. No.: 10/883,172

(22) Filed: Jul. 1, 2004

(51) Int. Cl.
*H01L 31/00* (2006.01)

(52) U.S. Cl. .............................. 701/3; 345/7; 345/640; 340/447; 348/115; 382/307

(58) Field of Classification Search .................... 701/3; 340/447, 425.5; 345/633, 7, 640, 639, 619, 345/629, 76; 348/113, 115, 148; 250/330; 382/276, 190, 307, 103; *H01L 31/00*
See application file for complete search history.

(56) References Cited

U.S. PATENT DOCUMENTS

| | | | | |
|---|---|---|---|---|
| 4,752,824 A | * | 6/1988 | Moore | 348/115 |
| 5,534,694 A | * | 7/1996 | Ball et al. | 250/330 |
| 6,119,055 A | * | 9/2000 | Richman | 701/16 |
| 6,232,602 B1 | | 5/2001 | Kerr | 250/330 |
| 6,373,055 B1 | | 4/2002 | Kerr | 250/330 |
| 6,405,107 B1 | * | 6/2002 | Derman | 701/3 |
| 7,091,468 B2 | * | 8/2006 | Rols et al. | 250/214 R |
| 7,475,852 B2 | * | 1/2009 | Hewitt et al. | 244/135 A |
| 2002/0008641 A1 | * | 1/2002 | Sample et al. | 340/945 |
| 2002/0185600 A1 | * | 12/2002 | Kerr | 250/330 |
| 2004/0105573 A1 | * | 6/2004 | Neumann et al. | 382/103 |
| 2004/0169663 A1 | * | 9/2004 | Bernier | 345/629 |
| 2004/0178894 A1 | * | 9/2004 | Janssen | 340/435 |
| 2004/0227703 A1 | * | 11/2004 | Lamvik et al. | 345/76 |
| 2005/0232512 A1 | * | 10/2005 | Luk et al. | 382/276 |

OTHER PUBLICATIONS

U.S. Appl. No. 10/454,015, "Integrated Enhanced Vision System," filed Jun. 4, 2003, R.B. Wood.

* cited by examiner

*Primary Examiner*—Tuan C To
(74) *Attorney, Agent, or Firm*—Daniel M. Barbieri

(57) ABSTRACT

An enhanced vision system for an aircraft is disclosed. The invention includes a display apparatus having a display element positioned between the pilot and a scene. The display element permits the pilot to view the scene therethrough. A first sensor is mounted adjacent to the display element. The first sensor is configured to detect light having a first radiation spectrum emanating from a first portion of the scene. A second sensor is mounted upon the aircraft away from the display element. The second sensor is configured to detect light having a second radiation spectrum emanating from a second portion of the scene. The display element is configured to visually represent the detected light with the first radiation spectrum precisely conformal with the scene as viewed by the pilot. The display element is configured to visually represent the detected light with the second radiation spectrum substantially conformal with the scene as viewed by the pilot.

9 Claims, 4 Drawing Sheets

DUAL WAVELENGTH ENHANCED VISION SYSTEM OPTIMIZED FOR VISUAL LANDING LIGHT ALIGNMENT

FIELD OF THE INVENTION

The invention relates to aircraft navigation, and more particularly, to the integration of head-up displays and imaging sensors.

BACKGROUND OF THE INVENTION

The demand for head-up display (HUD) systems on airplanes is increasing as more pilots become acquainted with the advantages of the systems. Briefly described, a HUD system typically includes a viewing element, called a combiner, that is placed in a pilot's forward field of view. The combiner is substantially transparent but is treated to be reflective to certain wavelengths of light. When symbolic information is projected onto the combiner from a relay lens using those wavelengths, the combiner refocuses the information at optical infinity and the information is overlaid on the pilot's forward field of view. A HUD system may therefore be advantageously used to provide information to the pilot, especially when the pilot needs to maintain eye contact with the forward field of view. Such situations include all phases of flight, but use of a HUD during take-off, landing, and taxi operations offer the greatest benefits.

Another technology that provides added situational awareness to an aircraft pilot is the use of imaging sensors. A sensor such as a camera can provide real-time images of scenes of interest to the pilot. Imaging sensors are especially useful when the sensors are configured to sense non-visible radiation wavelengths. For example, runway lights may be detected in the near infra-red wavelength range even if inclement weather partially obscures lights from the pilot's view in the visible wavelength range.

There has been some interest in displaying images from an imaging sensor using a HUD such that the displayed image is conformal with, or overlays, a pilot's view through the windshield. Such a combination of situational technologies (HUD plus imaging sensor), known as an enhanced vision system or EVS systems, would further assist a pilot in guidance and navigation. However, several challenges must be overcome to effectively provide such an integrated EVS system. For example, there is some controversy as to which sensor technology provides the most useful or relevant information to a pilot. The answer to this controversy appears to be that because of the wide variety of useful information that could be sensed, there is no single "best" sensor; instead, a combination of sensors may provide the best overall capability. Of particular interest are long or mid-wavelength infrared (IR) sensors, which can be used to detect thermal emissions and thereby provide compelling thermal images of a runway environment. However, long and mid-wavelength IR cannot directly detect landing lights. Also of interest are short-wavelength IR, or near IR sensors, which are useful in detecting approach lights as well as runway centerline and edge lights in an airstrip touchdown zone.

One of the major challenges associated with the image sensing portion of known EVS systems is finding a physical location for the sensor or sensors. The radome of the aircraft is often identified as the best location because of the sensor view from the radome, because an IR transmitting window can be integrated into the radome, and because there is a space envelope to house the sensor within the radome. Known IR transmitting windows allow both long and mid-wavelength IR and near IR to pass to the sensor.

A problem with installing the imaging sensor in the radome is that the sensor is physically located away from the pilot's eyes. The difference between the sensor field-of-view and the pilot's field-of-view introduces parallax errors between the sensor's view and the pilot's view. This can cause a significant issue when the short-wavelength IR sensor is placed in the radome. In such a situation there is a difference between the position of the landing lights directly seen by a pilot through the HUD combiner, and the same landing lights sensed by the short-wave IR sensor and displayed on the HUD, thereby causing a visual misregistration of the landing lights, which under certain circumstances could cause a loss of confidence in the EVS system. The misregistration between the pilot's view of the real world and the sensor view is a function of the physical spacing between the sensor and the pilot, as well as the distance to the object being viewed. Parallax errors are largest for objects located directly in front of the aircraft, such as runway centerline lights and taxi edge lights.

One method of overcoming parallax error is disclosed in U.S. patent application Ser. No. 10/454,015, entitled "Integrated Enhanced Vision System," invented by Robert B. Wood, and incorporated herein by reference in its entirety. Said patent application discloses a short-wave IR sensor mounted on the HUD combiner and configured to look out through the aircraft windshield. The short-wave IR sensor detects IR wavelengths that pass through the windshield. This method essentially eliminates parallax error between the pilot's view and the detected short-wave IR because of the close proximity of the sensor to the pilot's eyes. However, medium to long-wavelength IR sensors could not be similarly positioned because the aircraft windshield would likely block such IR wavelengths. Furthermore, completely compensating for parallax errors is also difficult and expensive and adds display latency.

It is therefore an object of the invention to provide an enhanced vision system for an aircraft that minimizes parallax errors between what an imaging sensor detects and what an aircraft pilot sees through the windshield of the aircraft.

It is also an object of the invention to provide an enhanced vision system that minimizes or eliminates any re-certification requirements of the aircraft or of other aircraft systems.

It is further an object of the invention to provide an enhanced vision system that eliminates expensive modifications to the aircraft.

A feature of the invention is a near-infrared sensor physically integrated into a HUD system.

An advantage of the invention is the essential elimination of parallax errors between readily recognizable real-world objects detected by the sensor and the same object directly viewed by the pilot through the combiner.

SUMMARY OF THE INVENTION

The invention provides an enhanced vision system for an aircraft. The invention includes a display apparatus that is configured to generate and display information for a pilot of the aircraft. The display apparatus includes a display element positioned between the pilot and a scene. The display element permits the pilot to view the scene therethrough. A first sensor is mounted adjacent to the display element. The first sensor is configured to detect a light having a first radiation spectrum emanating from a first portion of the scene, where the first portion of the scene has a first level of importance for operation of the aircraft because certain elements of the detected scene can be viewed directly by the pilot through the combiner. A second sensor is mounted upon the aircraft away from the display element. The second sensor is configured to detect light having a second radiation spectrum emanating from a second portion of the scene, where the second portion of the scene has a second level of importance for operation of the aircraft because the second sensor detects scene elements that may not have a visible counterpart. The second level of importance is less than the first level of importance. The display element is configured to visually represent the detected light with the first radiation spectrum precisely conformal with the scene as viewed by the pilot. The display element is configured to visually represent the detected light with the second radiation spectrum substantially conformal with the scene as viewed by the pilot, such that the pilot simultaneously views the scene and the visual representation of the detected radiation when looking at the display element.

The invention also provides a system for enhancing situational awareness of a pilot in an aircraft. The aircraft has a windshield through which the pilot views a scene in a predetermined direction. The system includes a substantially transparent display device selectively interposed between the windshield and the pilot such that viewing the scene through the display device is substantially unimpeded. A first sensor detects a first range of non-visible radiation that passes through the windshield. The first sensor is mounted adjacent to the pilot and aimed in the predetermined direction. A second sensor detects a second range of non-visible radiation. The second sensor is mounted in a radome of the aircraft or other convenient location and aimed in the predetermined direction. A processor receives inputs from the first sensor and the second sensor corresponding to the radiation detected by the first and second sensors. The processor creates a visual representation of the detected and combined radiation from either or both sensors. A projecting apparatus receives signals from the processor to project the visual representation onto the display device such that the visual representation of the first range of detected radiation is precisely aligned with the view of the scene by the pilot and the visual representation of the second range of detected radiation is substantially aligned with the view of the scene by the pilot.

The invention further provides a method of providing enhanced situational awareness to a pilot of an aircraft. According to the method, a substantially transparent display device is interposed between the pilot and a windshield of the aircraft such that viewing a scene in a predetermined direction through the display device is substantially unimpeded. From a position adjacent to the display device, a first range of radiation from the predetermined direction that passes through the windshield is detected. From a position on the aircraft away from the display device, a second range of radiation from the predetermined direction is detected. A visual representation is created of the detected first range of radiation. A visual representation is created of the detected second range of radiation. The visual representation is displayed on the display device such that the visual representation of the detected first range of radiation is precisely aligned with the view of the scene by the pilot, and the visual representation of the detected second range of radiation is substantially aligned with the view of the scene by the pilot.

DETAILED DESCRIPTION OF THE DRAWINGS

Figure 1:
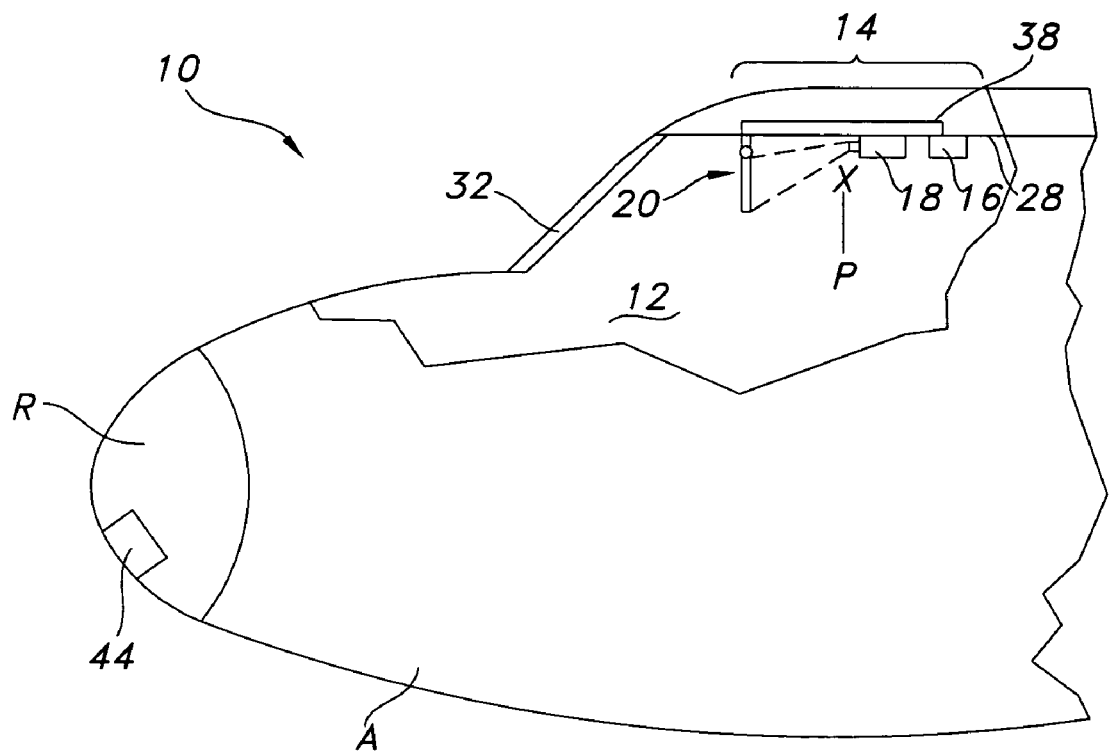
FIG. 1 is a side elevational view of the forward section of an aircraft showing a simplified view of the cockpit in cutout format.
Figure 2:
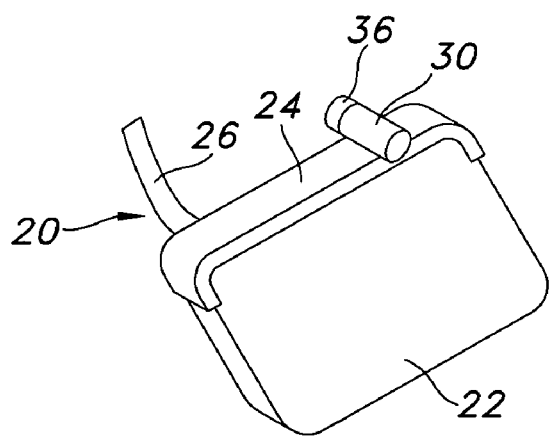
FIG. 2 is a perspective view of a head-up display combiner that forms part of the invention.

The invention is an enhanced vision system (EVS system) that locates a near-infrared sensor, which is sensitive to wavelengths of light less than about 1.5 microns, on a combiner of a head-up display (HUD) system such that the sensor is positioned to look out through an aircraft windshield. The invention also includes a mid- or long-wavelength infrared sensor disposed at another position on the aircraft, preferably in the radome or other suitable location. An EVS system according to the invention is shown in FIG. 1 at reference number 10. A portion of EVS system 10 is mounted in an aircraft cockpit 12, which is shown in simplified form for ease of understanding of the invention. EVS system 10 includes a HUD system 14 configured to project an image into the forward view of a pilot of an aircraft A to assist the pilot in navigating and operating the aircraft. HUD system 14 includes a processor 16 that formats the image to be projected, and a projector 18 that projects the image onto a combiner 20. Combiner 20 is shown in more detail in FIG. 2 and includes a combining element 22. Combining element 22 may be slightly curved according to system requirements. According to one type of HUD design, combining element 22 is generally transparent but includes a coating (not shown) that reflects wavelengths of visible light within a predetermined range. When projector 18 projects an image using wavelengths of light in that predetermined range, the image is reflected toward a position P (FIG. 1) where the pilot's eyes are located. Combiner 20 also includes a support bracket 24 that, in the depicted embodiment, runs along the top surface of combining element 22, but may be placed in other locations if desired. A mounting arm 26 extends from support bracket 24 and is rotationally attached to the overhead structure 28 of cockpit 12.

EVS system 10 also includes a SWIR (short-wave infrared) sensor 30 attached to support bracket 24 of combiner 20. SWIR sensor 30 is directed to detect radiation passing through the front windshield 32 of aircraft A. Since most aircraft windshields are made of materials that permit radiation with wavelengths up to about 2 microns to pass therethrough, SWIR sensor 30 is selected to be sensitive to near-IR radiation, which has wavelengths within a range of about 0.8 microns to about 1.5 microns. In some circumstances a filter 36 may be included to filter out visible light from the radiation sensed by the SWIR sensor.

Two exemplary types of sensors operate in the near-IR spectral region. The first is an uncooled Indium-Gallium-Arsenide (InGaAs) based sensor, which detects radiation throughout a broad range of the near-IR spectrum, and the other is a silicon-based sensor, which requires a filter to exclude visible light from the radiation detected by the sensor. Although the silicon-based sensor detects radiation within a smaller range of the near-IR spectrum (about 0.8 microns to about 1.1 microns), it is less expensive than the InGaAs based sensor and may therefore be preferred in many applications.

Figure 3:
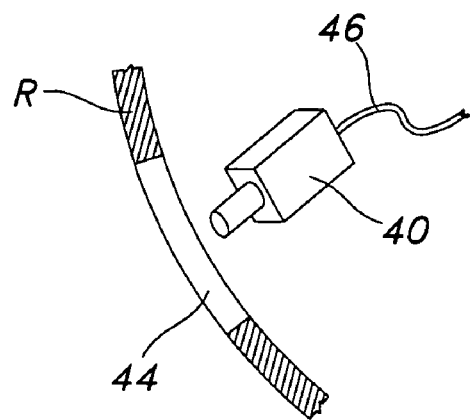
FIG. 3 is a sectional view of a portion of the radome of the aircraft of FIG. 1.

EVS system 10 includes a second sensor 40 (FIG. 3) preferably disposed in the radome R of aircraft A. Second sensor 40 is selected to detect wavelengths in the medium to long infrared spectrum, and preferably in the range of 3 to 5 microns (mid) or 7 to 13 microns (long). The thermal background is typically sensed in these spectral ranges. A window 44 is disposed in radome R. Window 44 is made of a material, such as sapphire or germanium, that permits medium to long-range IR to pass therethrough. Second sensor 40 is installed to detect medium or long-range IR in substantially the same field-of-view as SWIR sensor 30 is calibrated to detect shortwave IR. The second sensor may also include a filter (not shown) to obtain a preferred range of IR wavelengths if the type of sensor selected inherently senses a wider than needed radiation wavelength range.

Figure 4:
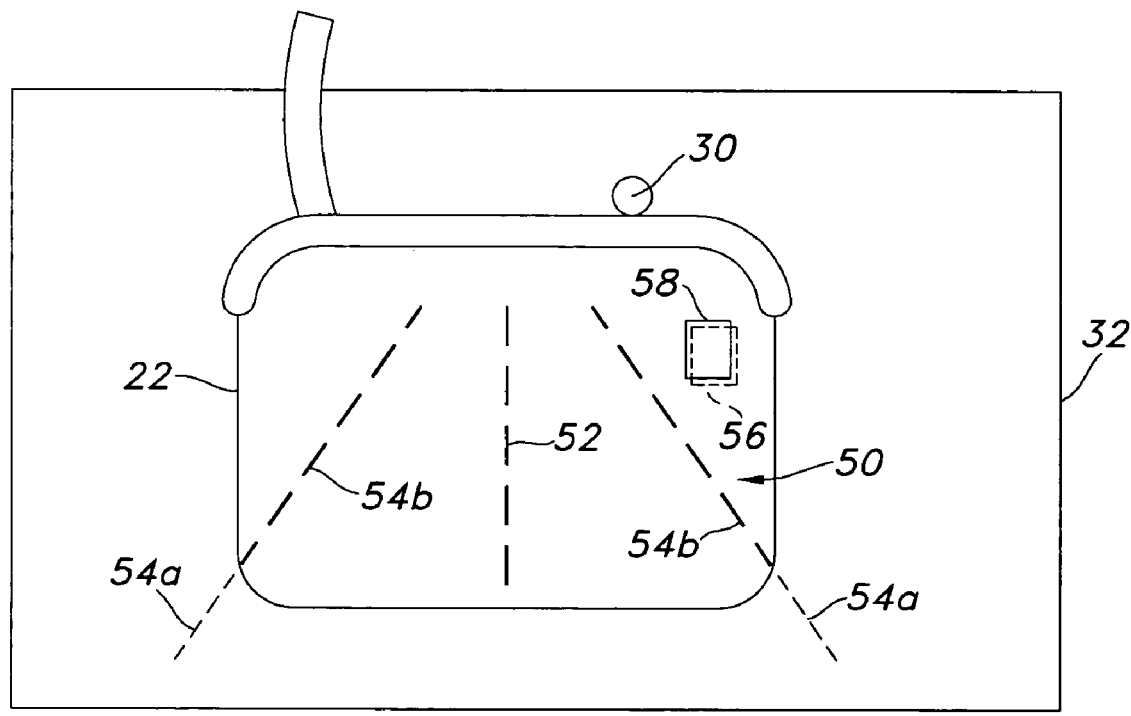
FIG. 4 is a front elevational view of the combiner shown in FIG. 2.

In operation, SWIR sensor 30 detects radiation in the near-IR wavelength range, which includes light emitted by airport landing lights. As previously discussed, filter 36 may be required to eliminate visible light. SWIR sensor 30 provides an input, through a cable 38, to processor 16. Second sensor 40 detects radiation in the mid or long-IR wavelength range, which does not include light directly emitted by airport landing lights but may include a thermal signature of the housing of the landing light. Second sensor 40 provides an input, through cable 46, to processor 16. The processor formats the detected radiation from the two sensors and creates a visible representation of the scene that corresponds with what the pilot is actually seeing through combining element 22 and front windshield 32. Projector 18 receives instructions from the processor to project the visible representation onto combining element 22 of combiner 20 such that the visible representation is aligned, from the pilot's perspective, with the pilot's view out front windshield 32. FIG. 4 schematically shows a visible representation 50, created by EVS system 10, of a runway during a taxi operation. Runway centerline lights 52 and edge lights 54a, 54b emit radiation within the near-IR and are therefore detected by SWIR sensor 30. It can be observed that edge lights 54a viewed through front windshield 32 but not through combining element 22 are not as readily apparent as edge lights 54b viewed through the combining element with the aid of sensor 30. Because SWIR sensor 30 is mounted immediately adjacent the pilot, there is substantially no difference between the actual position of runway lights 52, 54 as observed by the pilot and the sensed and displayed position of the runway lights as sensed by the SWIR sensor. On the other hand, because second sensor 40 is mounted in the radome or at another position on the aircraft away from the pilot, there is a misregistration, due to parallax error, between an actual position of an object 56 as viewed by the pilot, and a position 58 of the object as sensed by second sensor using medium to long range IR wavelengths. However, such misregistration should not confuse the pilot because the SWIR sensor has precisely located the position of the landing lights.

Figure 5A:
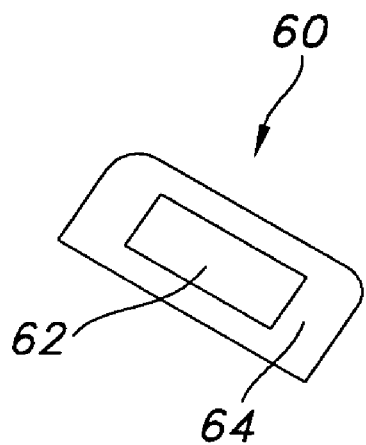
FIG. 5A is a perspective view of a runway light.
Figure 5B:
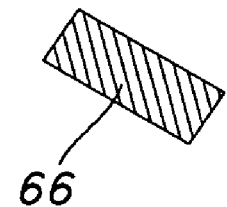
FIG. 5B is a perspective view of an output of a sensor according to the invention.
Figure 5C:
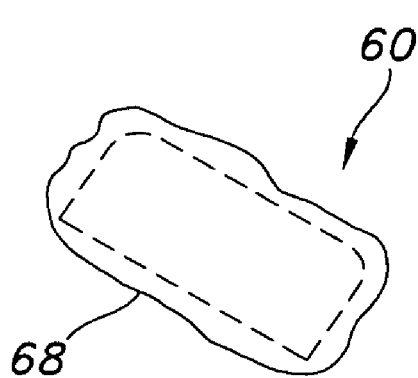
FIG. 5C is a perspective view of an output of a sensor according to the invention.
Figure 5D:
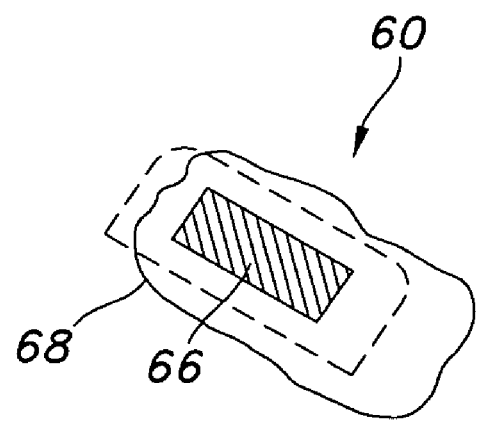
FIG. 5D is a perspective view of the outputs of the sensors of FIGS. 5B and 5C overlaid upon the runway light of FIG. 5A.

As a further example, FIG. 5A shows a landing light 60 having a filament 62 and a lamp housing 64. FIG. 5B shows the output 66 of the SWIR sensor, which senses the short-wavelength IR emitted by filament 62. FIG. 5C shows the output 68 of the second sensor, which senses the thermal energy caused by the operation of the landing light. FIG. 5D shows the outputs 66, 68 of the SWIR sensor and the second sensor, respectively, overlaid on a view of the landing light, which is shown in dashed lines. Because the SWIR sensor is positioned adjacent the pilot, output 66 is displayed precisely conformal with filament 62 of the landing light. On the other hand, because the second sensor is positioned away from the pilot (in the radome, for example), output 68 is not precisely conformal with the actual position of the landing light. However, it is acceptable for output 68 to be only substantially conformal with, or having a slight misregistration with respect to, the landing light because the output 66 from the SWIR sensor accurately positions the filament of the landing light. Thus, the conformal, enhanced view provided by EVS system 10 is therefore helpful to a pilot in ascertaining the precise location of landing or runway lights, while providing a slightly misregistered view of objects less critical or important for landing operations, such as the general thermal background of the landing light enclosure or other thermally active objects. Such information is especially helpful during take-off, landing, and taxi operations where parallax errors tend to be the greatest, and during inclement weather, such as fog, rain, snow, or the like, or when the view of the pilot is otherwise obscured.

Figure 6:
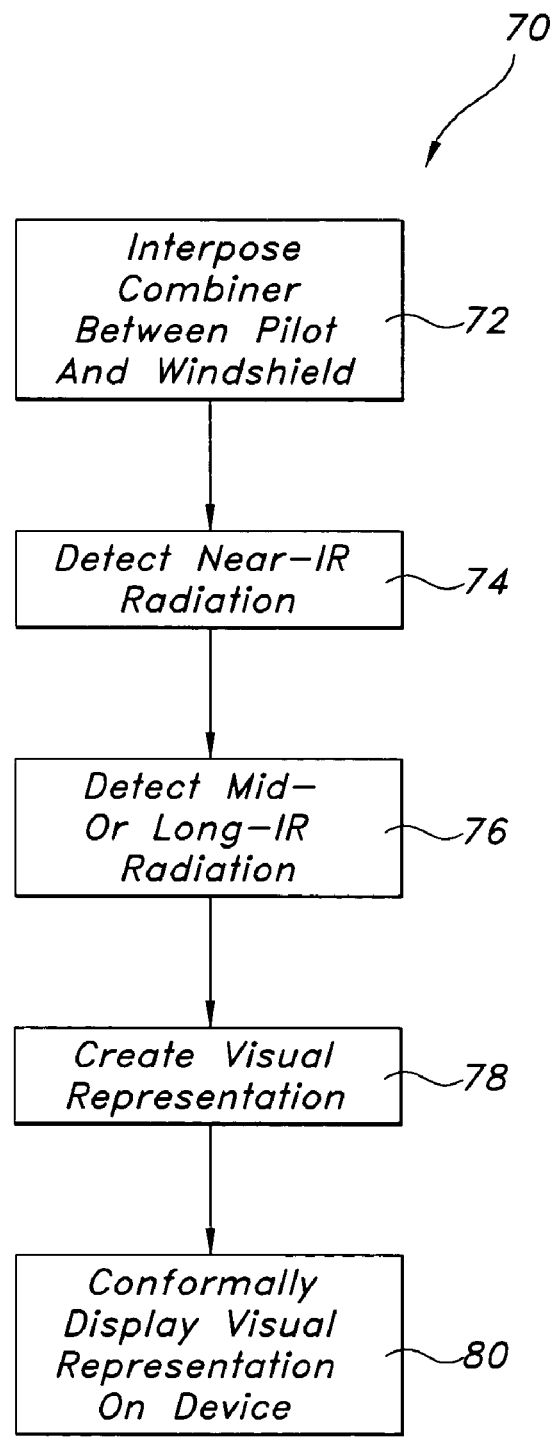
FIG. 6 is a flowchart showing a method according to an embodiment of the invention.

FIG. 6 shows a method 70 of integrating a real-world view with a sensed view using non-visible wavelengths of radiation according to an embodiment of the invention. According to the method, in step 72 a substantially transparent display device, such as combining element 22, is interposed between a pilot and a windshield of an aircraft such that viewing a scene in a predetermined direction through the combining element is substantially unimpeded. In step 74, non-visible, short-wave radiation from the predetermined direction that passes through the windshield is detected adjacent the display device. This may be accomplished by mounting SWIR sensor 30 on combiner 20. In step 76, non-visible, medium to long-range radiation from the predetermined direction is detected at a location on the aircraft away from the display device. This may be accomplished by mounting second sensor 40 in radome R. In step 78 a visual representation of the detected radiation from the two sensors is created. In step 80, the visual representation is conformally displayed on the display device such that the visual representation of radiation detected by the SWIR sensor is precisely aligned with the view of the scene by the pilot, and the visual representation of radiation detected by the second sensor is substantially aligned with the view of the pilot, it being understood that the visual representation will include slight misregistration of objects detected using the medium to long-range IR sensor.

The invention may be varied in many ways while keeping with the spirit of the invention. For example, other types of near-IR sensors may be used. In some applications, filter 36 may be eliminated. Second sensor 40 may be placed at other locations of the aircraft, such as between the radome and the aircraft windshield, or mounted on the landing gear such that the second sensor is properly deployed only when the landing gear is actuated. Furthermore, the range of wavelengths detectable by the SWIR sensor is limited in part by the materials from which the aircraft windshield is made. If the aircraft windshield were made of a material that permits a wider, or different, spectrum of unseen radiation to pass therethrough, then a sensor that detects a similarly widened or different spectrum could be mounted on the combiner.

Another variation is to provide a spectrum-filtering characteristic to a portion of the aircraft windshield in the forward field of view of the aircraft pilot. This may be accomplished by applying a filter directly to a portion of the surface of the windshield, or by installing a window that is made of a material that permits desired wavelengths of light to pass therethrough. Such spectrum-filtering characteristic of the windshield would serve as a filter in cooperation with, or in replacement of, filter 36.

Still another variation is to use a second sensor that is part of a millimeter-wave radar unit, which has shown promise in forming an image in adverse weather conditions. Such a radar unit emits radar waves in the millimeter wavelength and detects those waves reflected by objects in its path. The output of a millimeter-wave radar unit can be combined with the SWIR sensor to provide the benefits of the invention as described herein.

The invention may also be used in situations where solid-state runway lighting is used. Although solid-state lights such as light-emitting diodes (LEDs) emit little light within the infrared wavelength range, light emitted by LEDs is typically designed to be limited to a predetermined narrow wavelength band within the visible spectrum. The invention as previously disclosed may therefore be modified such that sensor 30 detects specific visible wavelengths of light emitted by LED runway lighting schemes. Filter 36 is selected to permit only the LED wavelengths to pass therethrough.

By mounting the SWIR sensor on the HUD combiner, the pilot's point of view of landing or runway lights is nearly identical with the point of view of the sensor. This eliminates parallax errors that occur when the sensor is placed in the radome of the aircraft, for example. Because objects detected by the medium or long-range IR sensor are merely displayed on the display without attempting to correct or compensate for parallax errors, the complexity and cost of EVS system 10 is substantially reduced when compared to EVS systems with parallax correction requirements.

Still another advantage is that sensor image processing is handled through the HUD system, and does not require a stand-alone independent processing unit. This reduces the number of parts required to be certified, installed, and maintained.

Yet another advantage is that SWIR image sensing can be performed by a compact, commercially-available, silicon-based CCD sensor that does not need to be environmentally ruggedized to the extent that it must withstand conditions outside the cockpit or cabin of an aircraft. Using such a commercially-available component substantially decreases the cost of acquiring and maintaining EVS system 10.

While the invention has been disclosed in its preferred form, the specific embodiments thereof as disclosed and illustrated herein are not to be considered in a limiting sense as numerous variations are possible. The subject matter of the invention includes all novel and non-obvious combinations and subcombinations of the various elements, features, functions and/or properties disclosed herein. No single feature, function, element or property of the disclosed embodiments is essential to all of the disclosed inventions. Similarly, where the claims recite "a" or "a first" element or the equivalent thereof, such claims should be understood to include incorporation of one or more such elements, neither requiring nor excluding two or more such elements.

It is believed that the following claims particularly point out certain combinations and subcombinations that are directed to the disclosed inventions and are novel and non-obvious. Inventions embodied in other combinations and subcombinations of features, functions, elements and/or properties may be claimed through amendment of the present claims or presentation of new claims in this or a related application. Such amended or new claims, whether they are directed to a different invention or directed to the same invention, whether different, broader, narrower or equal in scope to the original claims, are also regarded as included within the subject matter of the invention of the present disclosure.

What is claimed is:

1. An enhanced vision system for an aircraft, comprising:
    a display apparatus configured to generate and display information for a pilot of the aircraft, the display apparatus including a display element positioned between the pilot and a scene, wherein the display element is configured to permit the pilot to view the scene therethrough; and
    a first sensor mounted adjacent the display element and configured to detect light having a first radiation spectrum emanating from a first portion of the scene having a first level of importance for operation of the aircraft;
    a second sensor mounted upon the aircraft away from the display element and configured to detect light having a second radiation spectrum emanating from a second portion of the scene having a second level of importance for operation of the aircraft, where the second level of importance is less than the first level of importance;
    wherein the display element is configured to visually represent the detected light with the first radiation spectrum precisely conformal with the scene as viewed by the pilot, and wherein the display element is configured to visually represent the detected light with the second radiation spectrum substantially conformal with the scene as viewed by the pilot, such that the pilot simultaneously views the scene and the visual representation of the detected radiation when looking at the display element.

2. The enhanced vision system of claim 1, wherein the first radiation spectrum is between about 0.8 microns and about 2 microns and is within the infrared spectrum.

3. The enhanced vision system of claim 1, wherein the second radiation spectrum is between about 3 microns and about 5 microns.

4. The enhanced vision system of claim 1, wherein the second radiation spectrum is between about 7 microns and about 13 microns.

5. The enhanced vision system of claim 1, wherein the first portion of the scene includes lights adjacent a runway, and further wherein the second portion of the scene includes a thermal background of the scene.

6. The enhanced vision system of claim 1, wherein the second sensor is mounted in a radome of the aircraft.

7. The enhanced vision system of claim 1, wherein the display apparatus is a head-up display system and the display element is a combiner for the head-up display system, the head-up display system further comprising:
    a processor that receives inputs from the first sensor and the second sensor and creates an image to be viewed on the combiner; and
    a projector that transmits the image to the combiner.

8. The enhanced vision system of claim 1, wherein the first radiation spectrum includes visible wavelengths emitted by solid-state runway landing lights.

9. The enhanced vision system of claim 1, wherein the second radiation spectrum includes reflected wavelengths in the millimeter-wavelength range.

* * * * *